US011014481B2

(12) United States Patent
Tait

(10) Patent No.: US 11,014,481 B2
(45) Date of Patent: May 25, 2021

(54) HEADREST FOR A VEHICLE SEAT

(71) Applicant: Faurecia Automotive Seating, LLC, Auburn Hills, MI (US)

(72) Inventor: Shaun D. Tait, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 28 days.

(21) Appl. No.: 16/581,948

(22) Filed: Sep. 25, 2019

(65) Prior Publication Data

US 2021/0086675 A1    Mar. 25, 2021

(51) Int. Cl.
| | | |
|---|---|---|
| *B60N 2/879* | (2018.01) | |
| *B60R 11/02* | (2006.01) | |
| *B60N 2/806* | (2018.01) | |
| *B60R 11/00* | (2006.01) | |
| *H02J 7/00* | (2006.01) | |
| *B60N 2/809* | (2018.01) | |
| *B60Q 3/233* | (2017.01) | |

(52) U.S. Cl.
CPC ............. *B60N 2/879* (2018.02); *B60N 2/806* (2018.02); *B60R 11/0217* (2013.01); *B60N 2/809* (2018.02); *B60Q 3/233* (2017.02); *B60R 2011/0017* (2013.01); *H02J 7/0063* (2013.01)

(58) Field of Classification Search
CPC ........ B60N 2/879; B60N 2/806; B60N 2/809; B60R 11/0217; H02J 7/0063; B60Q 3/233
See application file for complete search history.

(56) References Cited

U.S. PATENT DOCUMENTS

| | | | |
|---|---|---|---|
| 5,687,230 A | 11/1997 | Olausson | |
| 6,424,055 B1 * | 7/2002 | Hambsch | B60R 21/01 307/10.1 |
| 6,744,898 B1 | 6/2004 | Hirano | |
| 6,975,737 B2 | 12/2005 | Hirao | |
| 7,609,946 B2 | 10/2009 | Schedivy | |
| 8,109,569 B2 * | 2/2012 | Mitchell | B60N 2/879 297/217.3 |
| 8,109,570 B2 * | 2/2012 | Nishiura | B60N 2/818 297/217.3 |
| 8,203,657 B2 | 6/2012 | Vitito | |
| 8,220,869 B2 * | 7/2012 | Kolich | B60N 2/5692 297/180.1 |

(Continued)

FOREIGN PATENT DOCUMENTS

| | | |
|---|---|---|
| CN | 2695284 | 4/2005 |
| CN | 208682687 | 4/2019 |

(Continued)

OTHER PUBLICATIONS

French Preliminary Search Report for French App. No. FR1873110 dated Oct. 24, 2019, BET190415 FR, 8 pages.

(Continued)

*Primary Examiner* — Syed A Islam
(74) *Attorney, Agent, or Firm* — Barnes & Thornburg LLP

(57) ABSTRACT

A vehicle seat includes a seat bottom and a seat back. The seat back includes a backrest and a headrest coupled to the backrest. The vehicle seat may be supplied with power so as to provide a powered experience to the vehicle seat. At least one device is coupled to the headrest and is supplied with power through the vehicle seat.

15 Claims, 4 Drawing Sheets

(56) References Cited

U.S. PATENT DOCUMENTS

| | | | | |
|---|---|---|---|---|
| 8,240,756 B2* | 8/2012 | Hartlaub | ................ | B60N 2/865 |
| | | | | 297/216.12 |
| 8,348,338 B2* | 1/2013 | Galecka | ................ | B60N 2/809 |
| | | | | 297/216.12 |
| 8,598,850 B2* | 12/2013 | Pisharodi | ................ | H02J 7/02 |
| | | | | 320/148 |
| 8,913,777 B2* | 12/2014 | Pelliccio | ................ | H04R 1/025 |
| | | | | 381/389 |
| 9,126,514 B2 | 9/2015 | Soar | | |
| 9,344,013 B2* | 5/2016 | Jarry | ..................... | B60N 2/821 |
| 9,421,892 B1 | 8/2016 | Abro | | |
| 9,432,716 B2 | 8/2016 | Liu | | |
| 9,713,974 B2* | 7/2017 | Mussi | .................... | B60N 2/914 |
| 9,802,519 B2* | 10/2017 | Subat | .................... | B60N 2/821 |
| 10,035,443 B1* | 7/2018 | Sayed | .................... | B60N 2/879 |
| 10,130,123 B2* | 11/2018 | Hatton | ................. | A24F 47/008 |
| 10,207,616 B2 | 2/2019 | James | | |
| 10,271,119 B2* | 4/2019 | Fujita | ..................... | A47C 7/72 |
| 10,569,685 B2* | 2/2020 | Kakishima | ............ | B60N 2/897 |
| 2005/0259523 A1 | 11/2005 | Kang | | |
| 2006/0220434 A1* | 10/2006 | Schulz | .................. | B60N 2/888 |
| | | | | 297/410 |
| 2008/0048479 A1* | 2/2008 | Yoshida | ............... | H01R 13/627 |
| | | | | 297/410 |
| 2008/0107257 A1 | 5/2008 | Matthews | | |
| 2008/0252798 A1 | 10/2008 | Vitito | | |
| 2010/0148550 A1* | 6/2010 | Kidd | ...................... | B60N 2/818 |
| | | | | 297/217.4 |
| 2012/0299554 A1* | 11/2012 | Kruglick | ................ | H02J 7/008 |
| | | | | 320/160 |
| 2013/0181492 A1 | 7/2013 | Prescott | | |
| 2014/0152057 A1* | 6/2014 | Truant | .................. | B60N 2/809 |
| | | | | 297/180.12 |
| 2015/0381941 A1* | 12/2015 | Watkins | ............. | H04N 5/23206 |
| | | | | 348/148 |
| 2017/0154006 A1 | 6/2017 | Tuccinardi | | |
| 2017/0207430 A1* | 7/2017 | Conrad | ............ | H01M 10/4207 |
| 2019/0001853 A1* | 1/2019 | Durkee | .................. | B60N 2/879 |
| 2019/0061576 A1* | 2/2019 | Tait | ...................... | B60N 2/5678 |
| 2019/0210500 A1 | 7/2019 | Brown | | |
| 2020/0231076 A1* | 7/2020 | Kapolnek | ............. | B60N 2/879 |

FOREIGN PATENT DOCUMENTS

| | | |
|---|---|---|
| DE | 19840444 A1 | 5/1999 |
| DE | 10241132 A1 | 3/2004 |
| DE | 10261898 | 7/2004 |
| EP | 3002152 A1 | 4/2016 |
| FR | 2696388 | 4/1994 |
| FR | 2768099 | 3/1999 |
| FR | 2768100 | 3/1999 |
| GB | 2224178 A | 4/1990 |
| KR | 20000018331 | 4/2000 |
| WO | 2015198745 | 12/2015 |

OTHER PUBLICATIONS

Office Action dated Sep. 27, 2019 for U.S. Appl. No. 16/013,183 (pp. 1-8).

Office Action dated Dec. 3, 2019 for U.S. Appl. No. 16/013,183 (pp. 1-9).

* cited by examiner

HEADREST FOR A VEHICLE SEAT

BACKGROUND

The present disclosure relates to an occupant support, and particularly to an occupant support including a seat bottom and a seat back. More particularly, the present disclosure relates to a headrest included in the seat back.

SUMMARY

According to the present disclosure, a vehicle seat includes a seat bottom and a seat back. The seat back includes a backrest and a headrest. The headrest is movable relative the backrest between an extended arrangement and a retracted arrangement and, in some embodiments, may be separated from the backrest. The headrest includes a headrest cushion, at least one headrest rod, and at least one headrest-rod support. The headrest cushion is movable relative to the backrest. The headrest rod is coupled to the headrest cushion and movable with the headrest cushion relative to the backrest. The headrest-rod support coupled to the backrest and formed to include a rod-receiving space configured to receive the headrest rod therein to mount the headrest cushion to the backrest.

In illustrative embodiments, an electronics system is coupled to the vehicle seat. The electronics system includes a vehicle power supply, a device mounted to the headrest cushion to move therewith, and a power transmission system. The power transmission system is configured to conduct power through the headrest rod from the backrest to the headrest cushion to supply power from the vehicle power supply to the device in the headrest cushion.

In illustrative embodiments, the power transmission system may further include a charger and a battery. The charger is arranged within a space formed in the backrest and interconnects the vehicle power supply and the headrest rods. The battery is arranged within a space formed in the headrest cushion and interconnects the headrest rods and the device.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of an occupant support in accordance with the present disclosure showing that the occupant support includes a vehicle seat with a movable headrest and an electronics system configured to transfer power from a vehicle power supply to a device coupled to the movable headrest;

FIG. 2 is a partial perspective and diagrammatic view of the occupant support of FIG. 1 showing the headrest includes a pair of headrest rods for mounting the headrest to a backrest of the vehicle seat and showing that the electronics system includes the vehicle power supply, the device, and a power transmission system configured to transfer power from the vehicle power supply to the device in the headrest through the headrest rods;

FIG. 3 is a diagrammatic view of the occupant support shown in FIGS. 1 and 2 showing that the power transmission system includes a charger coupled to the backrest and interconnected with the vehicle power supply and the headrest rods to transfer power therebetween, a battery interconnected with the headrest rods and the device and configured to transfer the power therebetween, and insulative sleeves coupled to the headrest rods to block the power from being conducted to other parts of the vehicle seat or to passengers in the vehicle;

Figure 6:
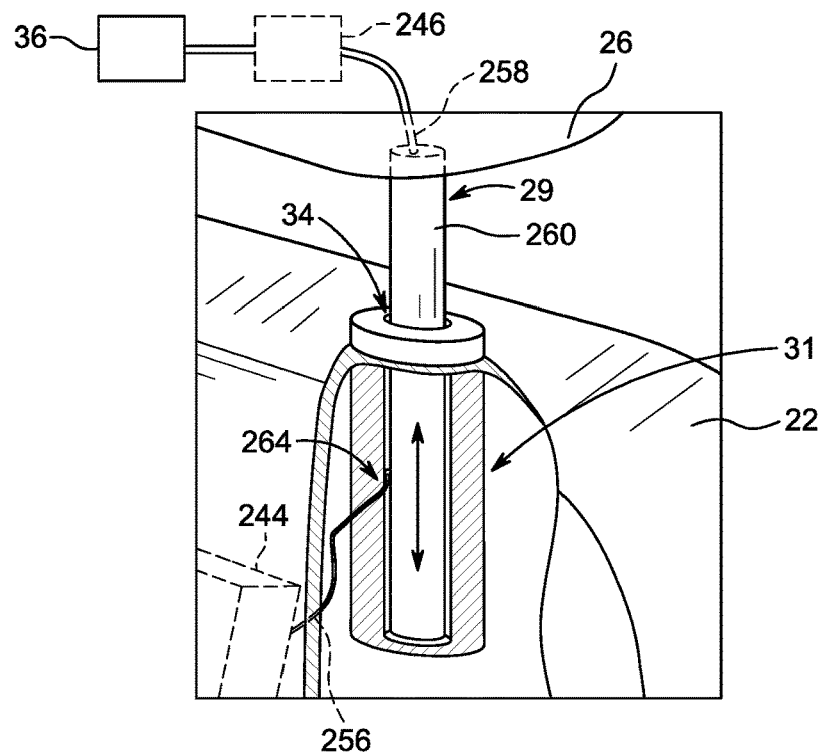
Figure 7:
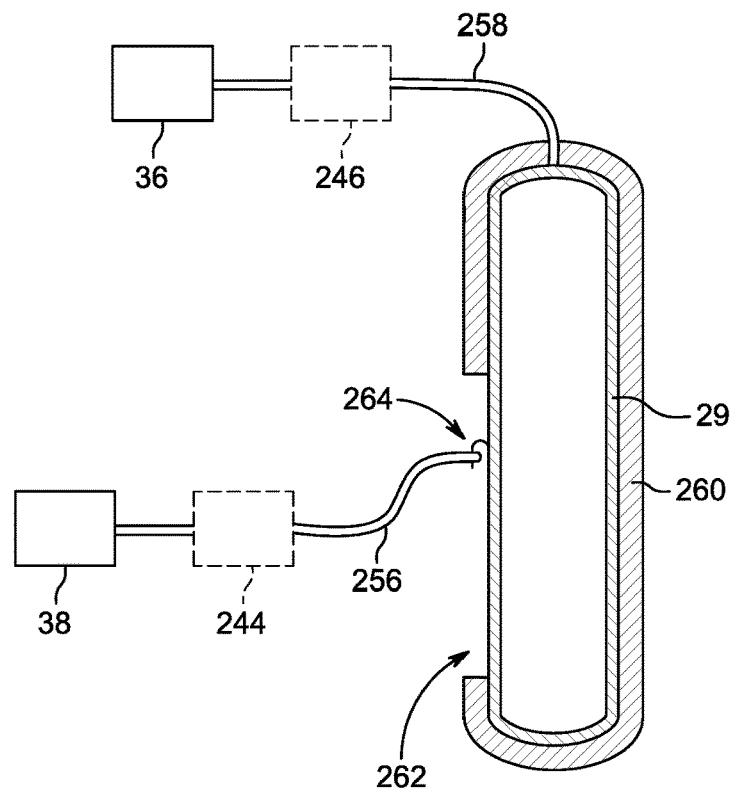

FIG. 6 is an enlarged perspective view of another embodiment of a power transmission system with portions broken away to show a power-transmission wire coupled to a headrest-rod support in a fixed position relative to the headrest rod and a conductive spring element biased into engagement with the headrest rod to transfer a power to the headrest rod when the headrest is in both the extended arrangement and the retracted arrangement; and FIG. 7 is a cross section of the headrest rod shown in FIG. 6 showing that the power transmission system includes an insulative sleeve partially encapsulating the headrest rod and being formed to include an elongated opening that extends longitudinally along the headrest rod so that the conductive spring element is directly engaged with the headrest rod.

DETAILED DESCRIPTION

Figure 1:
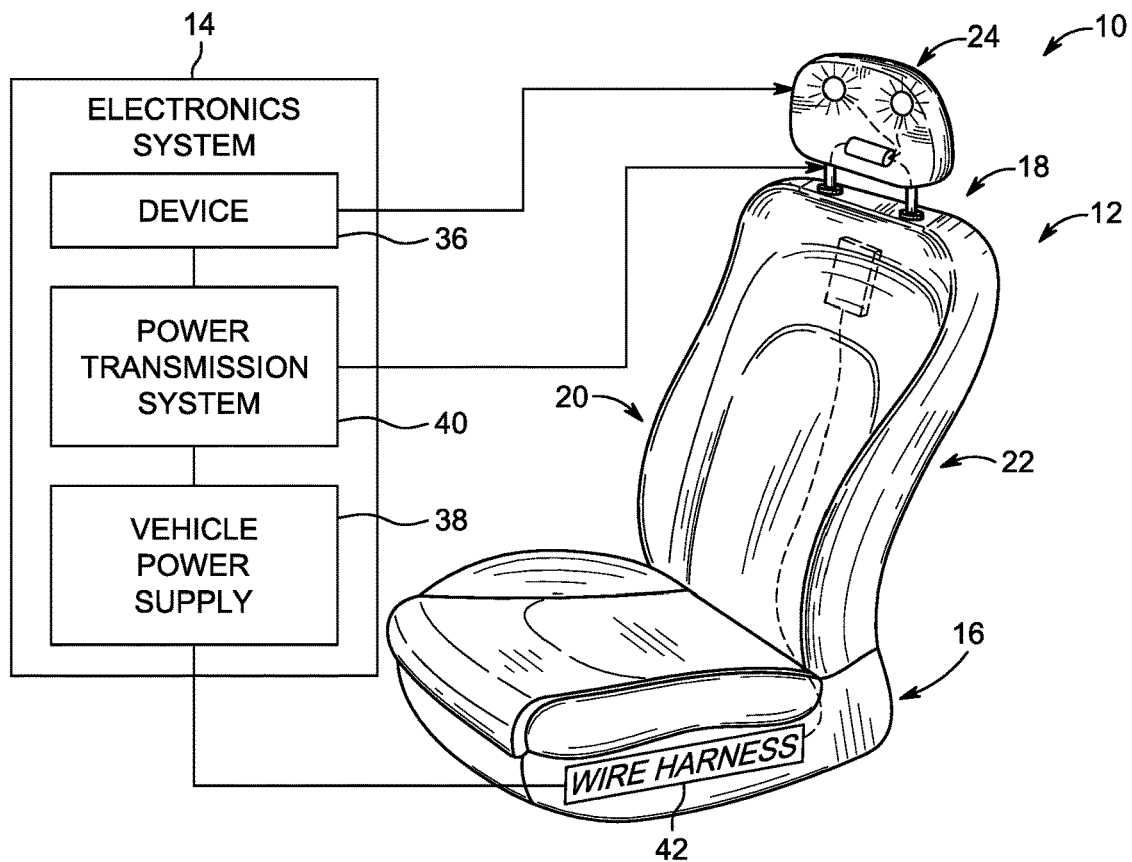
Figure 2:
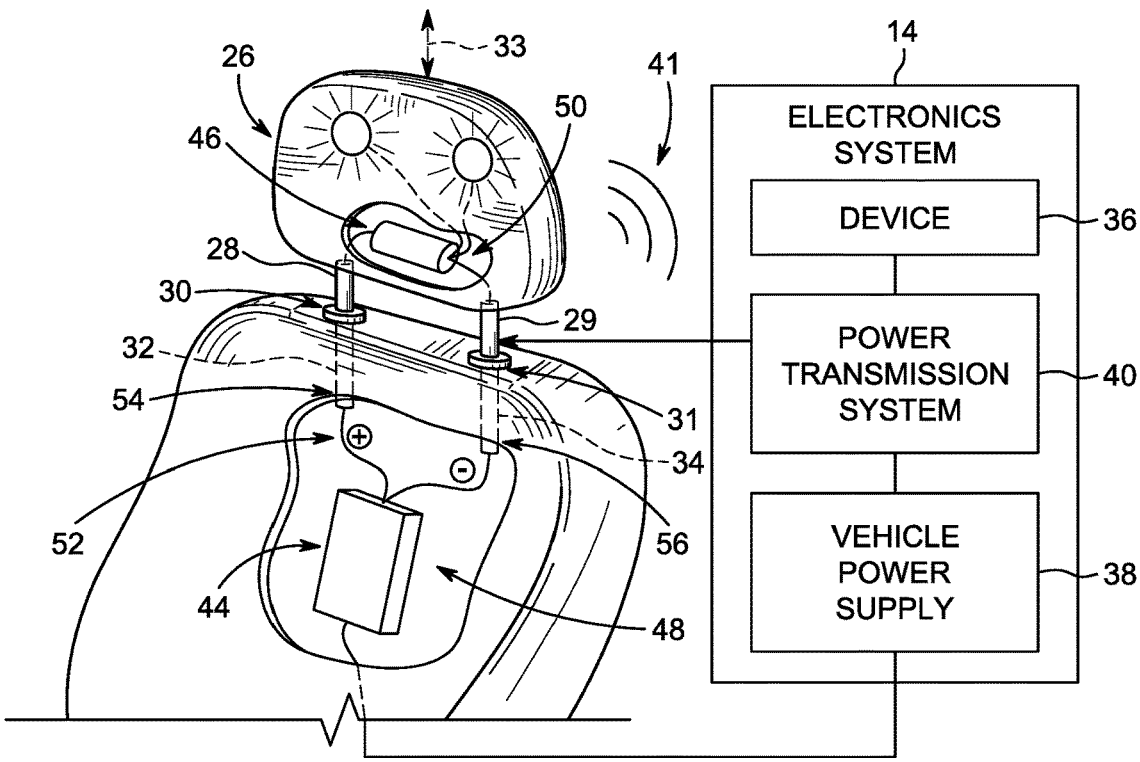

An occupant support 10 configured for use in a vehicle is shown in FIGS. 1 and 2. The occupant support 10 includes a vehicle seat 12 and an electronics system 14 coupled to the vehicle seat 12. The vehicle seat 12 includes a seat bottom 16 and a seat back 18 that cooperate to provide an occupant-support region 20 adapted to receive a occupant in the vehicle. The seat back 18 includes a backrest 22 and a movable headrest 24 coupled to the backrest 22 as shown in FIG. 1. The movable headrest 22 may be moved relative to the backrest 22 between an extended arrangement and a retracted arrangement to change an overall size and shape of the occupant-support region 20. The electronics system 14 includes one or more devices 36 coupled to the headrest 24 for use by one or more passengers in the vehicle when the headrest 24 is in both the extended arrangement and the retracted arrangement.

Figure 3:
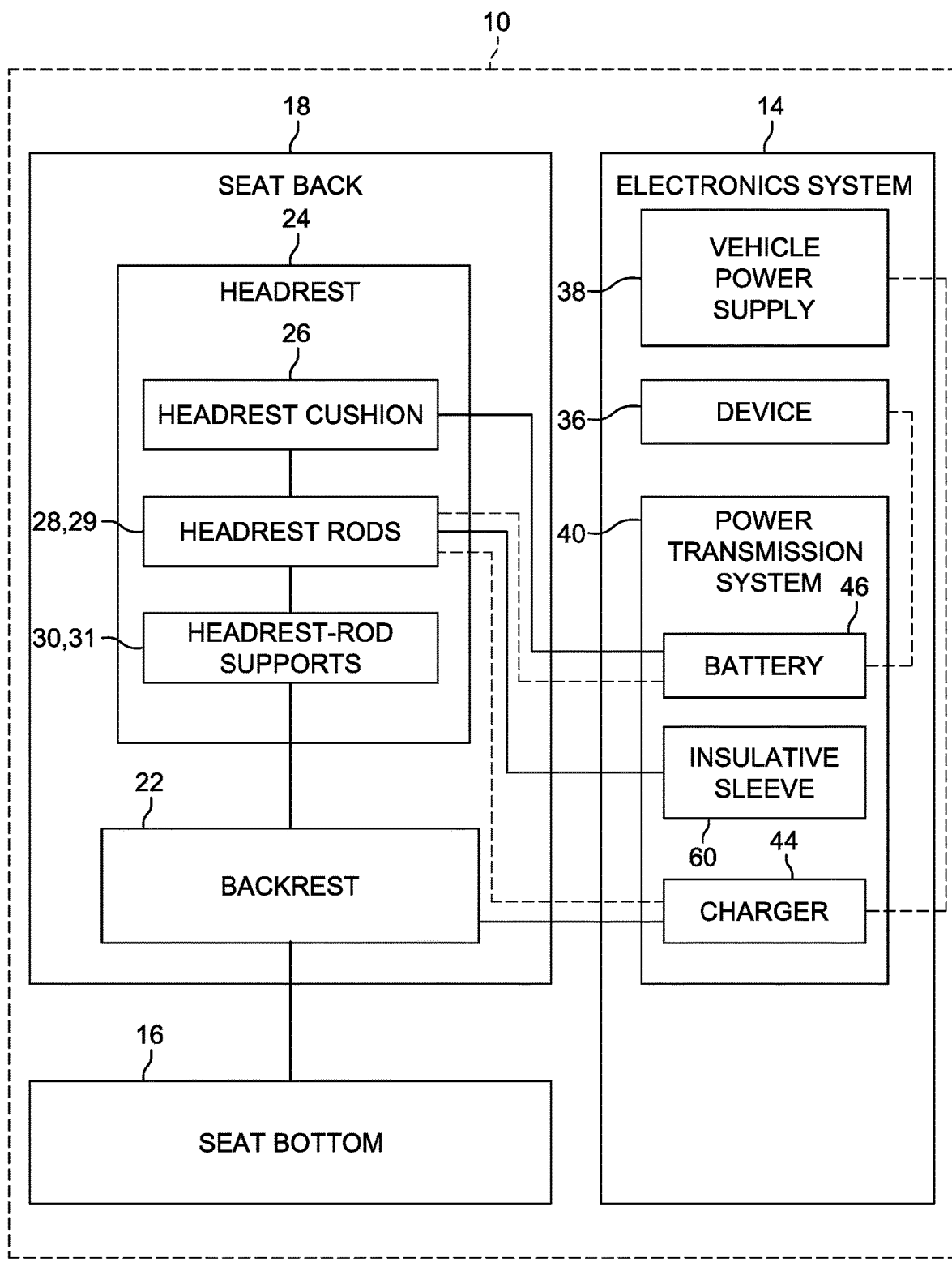

The electronics system 14 includes a power supply 38 that is configured to power the device 36 in the headrest 24. Power is conducted from the backrest 22 to the device 36 through one or more headrest rods 28 that couple the headrest 24 to the backrest 22. The electronics system 14 further includes a power transmission system 40, 240 provided by the headrest rods 28, 29. In some embodiments, the power transmission system 40 includes a charger 44, 244 and a battery 46, 246 to regulate power transfer through the headrest rods 28, 29 to the device 36 as shown in FIG. 3. The power transmission system 40, 240 may further include insulative sleeves 60, 260 at least partially encapsulating the headrest rods 28, 29 as shown in FIGS. 4-7.

The headrest 24 includes a headrest cushion 26 movable relative to the backrest 22, a pair of headrest rods 28, 29 coupled to the headrest, a pair of headrest-rod supports 30, 31 coupled to the backrest cushion as shown in FIG. 2. The headrest cushion 26 is configured to support the head of an occupant seated in the occupant-support region 20. The pair of headrest rods 28, 29 are fixed to the headrest cushion 26 and are movable with the headrest cushion 26 relative to the backrest 22. The headrest-rod supports 30, 31 are each formed to include a respective rod-receiving space 32, 34. Both headrest rods 28, 29 are received in a corresponding headrest-rod support 30, 31 to mount the headrest cushion 26 to the backrest 22.

The headrest cushion 26 is movable relative to the backrest 22 such that the headrest rods 28, 29 slide relative to the headrest-rod supports 30, 31 in the rod-receiving spaces 32, 34 as suggested in FIG. 2. In the illustrative embodiment, the headrest cushion 26 is movable upwardly and downwardly along an axis 33 between the extended arrangement in which the headrest cushion 26 is spaced apart from the backrest 22, and the retracted arrangement, in which the headrest cushion 26 is in contact with the backrest 22. The headrest cushion 26 may assume any position intermediate to the expanded arrangement and the retracted arrangement. In some embodiments, the headrest cushion 26 may also be movable inwardly toward the occupant-support region 20 and outwardly away from the occupant support region 20.

In some embodiments, the headrest rods 28, 29 may be fixed to the backrest 22 such that the headrest cushion 26 is movable relative to the headrest rods 28, 29. In such a configuration, the headrest-rod supports 30, 31 may be coupled to the headrest cushion 26 and movable therewith.

The electronic system 14 is coupled to the headrest 24 and the backrest 22 and includes the device 36, a vehicle power supply 38, and a power transmission system 40 as shown in FIG. 2. The device is mounted to the headrest cushion 26 and is configured to provide one or more functions for a passenger in the vehicle. The device 36 is an electrical device and is illustratively embodied as a pair of speakers configured to provide an audible output for passengers in the vehicle. However, in other embodiments, the device 36 may be any electrical device such as a monitor, a DVD player, one or more lights, climate control devices, or motors for moving various parts of the headrest 24. The power conducted through the headrest rods 28, 29 may be tailored specifically toward the device 36.

The vehicle power supply 38 is illustratively embodied as the vehicle's battery and is configured to provide power to the device 36 so that the device 36 can operate. In other embodiments, any suitable power able to deliver sufficient power to the device 36 may be used. The vehicle power supply 38 may be coupled to a wire harness 42 for the vehicle seat 12 to relay the power to the device 36 and/or other electrical devices in the vehicle seat 12. The power transmission system 40 is configured to transfer and deliver power from the vehicle power supply 38 to the device 36.

In the illustrative embodiment, the power transmission system 40 is provided by the headrest rods 28, 29 extending from the backrest 22 to the headrest cushion 26 as shown in FIG. 2. The headrest rods 28, 29 are made from a conductive material and are each coupled to the vehicle power supply 38 and the device 36 to provide means for conducting the power from the vehicle power supply 38 to the device 36 when the headrest is in both the extended arrangement and the retracted arrangement. In some embodiments, only one of the headrest rods 28, 29 may be used to conduct power from the vehicle power supply 38 to the device 36.

Some headrest rods are formed to include a hollow interior space that extends longitudinally through the headrest rods. In one example, conductive wires are fed through the interior space to transfer power from the backrest to one or more devices on the headrest cushion. In the illustrative embodiment, the power transmission system 40 is provided by the headrest rods 28, 29 themselves to conduct power through the headrest rods 28, 29 from the backrest 22 to the one or more devices 36 on the headrest cushion 26. In a different example, no wires conducting power to the device 36 are fed through the interior space of the headrest rods 28, 29.

Additionally, as more and more sophisticated devices are developed, other types of connections may be needed to transfer other electronic medium not related to powering the device, such as data, to those devices for them to function. Because no wires are provided to conduct power through the interior space formed in the headrest rods 28, 29 in the illustrative embodiment, more volume is available for other types of connections to service a wider array and a greater number of devices. Similarly, the size (i.e. thickness) of the headrest rods 28, 29 may also be minimized to improve an aesthetic appearance of the vehicle seat 12.

In other embodiments, data transfer to the device 36 may be accomplished using wireless means 41 to eliminate all wires from the interior space of the headrest rods 28, 29. The wireless means 41 may include one or more transceivers coupled with the device 36 and configured to receive signals from other transceivers in the vehicle. The device may include a suitable processor and memory storage device capable of processing the signals received. The signals may be in the form of WiFi, BLUETOOTH™, Ultra-Wideband (UWB), or any other suitable wireless signal.

In the illustrative embodiment, the power transmission system 40 may include a charger 44 and a battery 46 as shown in FIGS. 2 and 3. The charger 44 is arranged within a space 48 formed in the backrest 22 and interconnects the vehicle power supply 38 and the headrest rods 28, 29. The battery 46 is arranged within a space 50 formed in the headrest cushion 26 and interconnects the headrest rods 28, 29 and the device 36. In some embodiments, the charger 44, the battery 46, or both may be omitted and the power may be conducted directly through the headrest rods 28, 29 to the device.

The charger 44 is configured to regulate power transfer from the vehicle power 38 to the headrest rods 28, 29 and forms a circuit 52 using the headrest rods 28, 29 to power the device 36 as suggested in FIG. 2. The charger 44 provides a positive terminal 54 with headrest rod 28 and a negative terminal 56 with headrest rod 29. Current travels through the circuit 52 created by the headrest rods 28, 29 to power the device 36. If the battery 46 is included in the power transmission system 40, the circuit 52 charges the battery 46 and the battery 46 then transfers power to the device 36.

In the illustrative embodiment, the charger 44 includes a processor and a memory storage device storing instructions that, when executed are able to operate the charger to provide power to the device 36 or the battery 46. In some instances the charger 44 may be configured to cut power transmission to the headrest rods 28, 29 when a power level between the headrest rods 28, 29 exceeds a predetermined threshold. The power level between the headrest rods 28, 29 may exceed the predetermined threshold when an object, such as a passengers hand or arm, interconnects exposed areas of the headrest rods 28, 29. This type of event may cause a spike in power transfer from the charger 44 to the headrest rods 28, 29 and could harm the object interconnecting the headrest rods 28, 29. If power transfer is cut from the charger 44 to the headrest rods 28, 29, the device 36 may continue to be powered by the battery 46 until the object is removed from contact with the headrest rods 28, 29 and power transfer is restored. In another example, at least one of the headrest rods 28, 29 is grounded to prevent arching the two headrest rods 28, 29.

Figure 4:
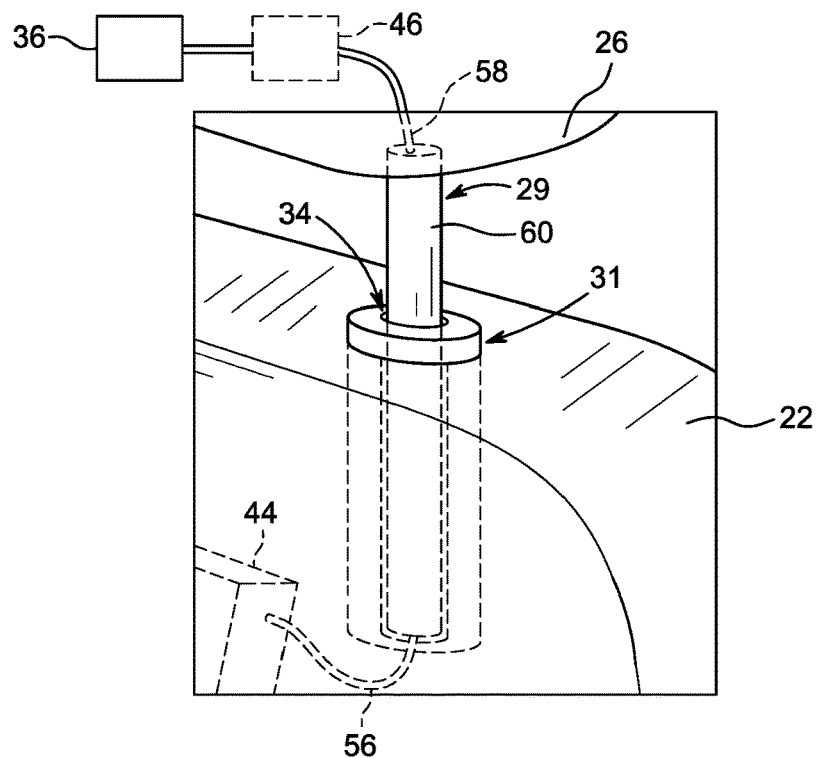
FIG. 4 is an enlarged perspective view of a portion of the occupant support shown in FIGS. 1 and 2 showing that the charger is directly coupled with a distal end of the headrest rod.
Figure 5:
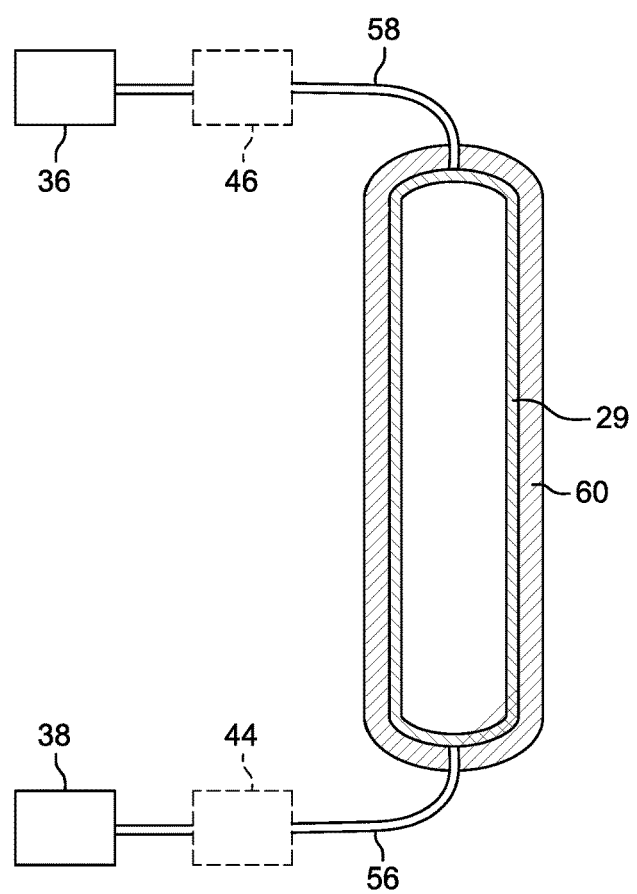
FIG. 5 is a cross section of the headrest rod shown in FIG. 4 with the insulative sleeve fully encapsulating the headrest rod and power transmission wires extending through the insulative sleeve and into engagement with the headrest rod to conduct the power therethrough.

Each headrest rod is coupled directly to a plurality of power-transmission wires 56, 58 to transfer power from the charger 44 to the device 36 or the battery 46 as shown in FIGS. 4 and 5. Although only one headrest rod 29 is shown in FIGS. 4 and 5, the other headrest rod 28 is substantially similar except for the different charges provided by the charger 44. Accordingly, only headrest rod 29 is described below and the disclosure of headrest rod 29 is incorporated in its entirety for headrest rod 28.

The power transmission system 40 may further include an insulative sleeve 60 that at least partially encapsulates each headrest rod 29 to contain power currents flowing therethrough as shown in FIGS. 3-5. Each of the power-transmission wires 56, 58 extends through the insulative sleeve 60 and couples to the headrest rod 29 so that the power currents are conducted from the charger to the device 36 or the battery 46. The power-transmission wires 56, 58 may also be insulated. The power transmission wires 56, 58 are provided with a sufficient length to allow for movement with the headrest rod 29 as the headrest 24 changes from the extended arrangement to the retracted arrangement.

Another embodiment of a power transmission system 240 configured to conduct power through the headrest rods 28, 29 to a device 236 is shown in FIGS. 6 and 7. The power transmission system 240 is similar to power transmission system 40 described above and shown in FIGS. 1-5. Accordingly, similar reference numbers in the 200 series are used to describe similar components common with power transmission system 40 and their differences are described below. The disclosure of power transmission system 40 above is incorporated by reference for power transmission system 240 for all other features not explicitly differentiated below.

The power transmission system 240 includes an insulative sleeve 260 that is configured to allow the headrest cushion 26 and the headrest rods 28, 29 to be completely removed from the backrest 22. The insulative sleeve 260 is formed to include an elongated opening 262 that extends longitudinally along at least a portion of a length of the headrest rods 28,29 to expose a section of each headrest rod 28, 29. The power transmission system 240 further includes a conductive element 264 coupled to each respective power-transmission wire 256 connecting the charger 244 to the headrest rods 28, 29.

Each conductive element 264 is illustratively embodied as a spring-type element and is mounted to each respective headrest-rod support 30, 31 in a fixed location relative within the rod-receiving space 32, 34. The conductive spring element 264 is aligned with the elongated opening 262 formed in the insulative sleeve 260 so that at least a portion of the conductive spring element 264 is biased into engagement with the headrest rod 29 as shown in FIG. 6. The conductive spring element 264 remains biased into engagement with the headrest rod 29 even when the headrest rod 29 is moved upwardly and downwardly. In this way, power is transferred from the vehicle power supply 38 to each headrest rod 28, 29 when the headrest 24 is in the extended arrangement and the retracted arrangement. In other embodiments, another conductive element may be used in place of the spring element 264 such as a carbon brush.

The following numbered clauses include embodiments that are contemplated and non-limiting:

Clause 1. An occupant support comprising a vehicle seat including a seat bottom and a seat back coupled to the seat bottom to extend upwardly away from the seat bottom, the seat back including a backrest and a headrest coupled to the backrest, and Clause 2. The occupant support of clause 1, any other clause, or any combination of clauses, further comprising an electronics system coupled to the seat back and including a device mounted to the headrest and a power transmission system configured to conduct power through a pair of headrest rods included in the headrest to supply power to the device on the headrest from a power supply.

Clause 3. The occupant support of clause 2, any other clause, or any combination of clauses, wherein the headrest includes a headrest cushion movable relative to the backrest between an extended arrangement and a retracted arrangement, a first headrest rod of the pair of headrest rods, a second headrest rod of the pair of headrest rods, and a pair of headrest-rod supports coupled to the backrest and each formed to include respective rod-receiving spaces configured to receive a corresponding headrest rod therein to mount the headrest cushion to the backrest.

Clause 4. The occupant support of clause 3, any other clause, or any combination of clauses, wherein the power transmission system includes a charger arranged within a space formed in the backrest and coupled to the first headrest rod and the second headrest rod to form a circuit.

Clause 5. The occupant support of clause 3, any other clause, or any combination of clauses, wherein the charger is a smart charger including a processor and a memory storage device, and the charger is configured to cut power transmission to the first and second headrest rods when power transmission between the first headrest rod and the second headrest rod exceeds a predetermined threshold.

Clause 6. The occupant support of clause 5, any other clause, or any combination of clauses, wherein the power transmission system further includes a battery arranged within a space formed in the headrest cushion and coupled to the charger to store power transferred to the battery from the charger, the battery coupled to the device and configured to supply power to the device when power transmission is cut from the charger to the device.

Clause 7. The occupant support of clause 2, any other clause, or any combination of clauses, wherein the power transmission system includes an insulative sleeve that at least partially encapsulates each headrest rod.

Clause 8. The occupant support of clause 7, any other clause, or any combination of clauses, wherein the power transmission system further includes a plurality of power-transmission wires and each headrest rod is coupled directly to a respective power-transmission wire included in the plurality of power transmission wires that extends through the insulative sleeve and couples to the headrest rod for movement with the headrest rod.

Clause 9. The occupant support of clause 7, any other clause, or any combination of clauses, wherein the insulative sleeve is formed to include an opening that extends longitudinally along at least a portion of a length of the headrest rods to expose a section of each headrest rod.

Clause 10. The occupant support of clause 9, any other clause, or any combination of clauses, wherein the power transmission system further includes a plurality of power-transmission wires and a respective power-transmission wire included in the plurality of power-transmission wires extends through each headrest-rod support and into engagement with each headrest rod.

Clause 11. The occupant support of clause 10, any other clause, or any combination of clauses, wherein the power transmission system further includes a conductive spring element coupled to each respective power-transmission wire, each conductive spring element mounted to each respective headrest-rod support in a fixed location relative to the headrest-rod supports and in engagement with each headrest rod, the conductive spring element positioned within the slit formed in the insulative sleeve so that power is transferred from the power supply to each headrest rod when the headrest is in the extended arrangement and the retracted arrangement.

Clause 12. An occupant support comprising a vehicle seat including a seat bottom and a seat back coupled to the seat bottom to extend upwardly away from the seat bottom, the seat back including a backrest and a headrest coupled to the backrest, the headrest including a headrest cushion movable relative to the backrest between an extended arrangement and a retracted arrangement, a pair of headrest rods coupled to the headrest cushion and movable with the headrest cushion relative to the backrest, and a pair of headrest-rod supports coupled to the backrest and formed to include respective rod-receiving spaces configured to receive the headrest rods to mount the headrest cushion to the backrest.

Clause 13. The occupant support of clause 12, any other clause, or any combination of clauses, an electronics system coupled to the seat back and including a vehicle power supple, a device mounted to the headrest cushion and configured to receive power from the vehicle power supply, and a power transmission system configured to regulate power transfer from the vehicle power supply to the device in the headrest cushion, the power transmission system including a charger arranged within a space formed in the backrest and a battery arranged within a space formed in the headrest cushion and coupled to the device.

Clause 14. The occupant support of clause 13, any other clause, or any combination of clauses, wherein the headrest rods are coupled to the charger and the battery and are configured to conduct power from the charger to the battery to supply power to the device in the headrest cushion.

Clause 15. The occupant support of clause 14, any other clause, or any combination of clauses, wherein a first headrest rod of the pair of headrest rods is a positive terminal and a second headrest rod of the pair of headrest rods is a negative terminal.

Clause 16. The occupant support of clause 15, any other clause, or any combination of clauses, wherein the charger is a smart charger including a processor and a memory storage device, and the charger cuts power transmission to the first and second headrest rods when power transmission between the first headrest rod and the second headrest rod exceeds a predetermined threshold.

Clause 17. The occupant support of clause 16, any other clause, or any combination of clauses, wherein the battery supplies power to the device when power transmission is cut from the charger to the device.

Clause 18. The occupant support of clause 12, any other clause, or any combination of clauses, wherein the power transmission system includes an insulative sleeve that at least partially encapsulates each headrest rod.

Clause 19. The occupant support of clause 18, any other clause, or any combination of clauses, wherein the power transmission system further includes a plurality of power-transmission wires and each headrest rod is coupled directly to a respective power-transmission wire included in the plurality of power transmission wires that extends through the insulative sleeve and is coupled to the headrest rod for movement with the headrest rod between the extended arrangement and the retracted arrangement.

Clause 20. The occupant support of clause 19, any other clause, or any combination of clauses, wherein the insulative sleeve is formed to include an opening that extends longitudinally along at least a portion of a length of the headrest rods to expose a section of each headrest rod.

Clause 21. The occupant support of clause 20, any other clause, or any combination of clauses, wherein the power transmission system further includes a plurality of power-transmission wires and a respective power-transmission wire included in the plurality of power-transmission wires extends through each headrest-rod support and into engagement with each headrest rod.

Clause 22. The occupant support of clause 21, any other clause, or any combination of clauses, wherein the power transmission system further includes a conductive element coupled to each respective power-transmission wire, each conductive element mounted to each respective headrest-rod support in a fixed location relative to the headrest-rod supports and in engagement with each headrest rod, the conductive element positioned within the slit formed in the insulative sleeve so that power is transferred from the vehicle power supply to each headrest rod when the headrest is in the extended arrangement and the retracted arrangement.

Clause 23. An occupant support comprising a vehicle seat including a seat bottom and a seat back coupled to the seat bottom to extend upwardly away from the seat bottom, the seat back including a backrest and a headrest coupled to the backrest, the headrest including a headrest cushion movable relative to the backrest, a headrest rod coupled to the headrest cushion and movable with the headrest cushion relative to the backrest, and a headrest-rod support coupled to the backrest and formed to include rod-receiving space configured to receive the headrest rod to mount the headrest cushion to the backrest.

Clause 24. The occupant support of clause 23, any other clause, or any combination of clauses, further comprising a device coupled to the headrest cushion.

Clause 25. The occupant support of clause 24, any other clause, or any combination of clauses, wherein the headrest rod is coupled electrically with a power supply and is configured to provide a power transmission system that conducts power through the headrest rod from the backrest to the headrest cushion to supply power to the device in the headrest cushion.

The invention claimed is:
1. An occupant support comprising
    a vehicle seat including a seat bottom and a seat back coupled to the seat bottom to extend upwardly away from the seat bottom, the seat back including a backrest and a headrest coupled to the backrest, and
    an electronics system coupled to the seat back and including a device mounted to the headrest and a power transmission system configured to conduct power through a pair of headrest rods included in the headrest to supply power to the device on the headrest from a power supply,
    wherein the power transmission system includes an insulative sleeve that at least partially encapsulates each headrest rod,
    wherein the insulative sleeve is formed to include an opening that extends longitudinally along at least a portion of a length of the headrest rods to expose a section of each headrest rod,
    wherein the power transmission system further includes a plurality of power-transmission wires and a respective power-transmission wire included in the plurality of power-transmission wires extends through each headrest-rod support and into engagement with each headrest rod, and wherein the power transmission system further includes a conductive spring element coupled to each respective power-transmission wire, each conductive spring element mounted to each respective headrest-rod support in a fixed location relative to the headrest-rod supports and in engagement with each headrest rod, the conductive spring element positioned within the opening formed in the insulative sleeve so that power is transferred from the power supply to each headrest rod when the headrest is in the extended arrangement and the retracted arrangement.

2. The occupant support of claim 1, wherein the headrest includes a headrest cushion movable relative to the backrest between an extended arrangement and a retracted arrangement, a first headrest rod of the pair of headrest rods, a second headrest rod of the pair of headrest rods, and a pair of headrest-rod supports coupled to the backrest and each formed to include respective rod-receiving spaces configured to receive a corresponding headrest rod therein to mount the headrest cushion to the backrest.

3. The occupant support of claim 2, wherein the power transmission system includes a charger arranged within a space formed in the backrest and coupled to the first headrest rod and the second headrest rod to form a circuit.

4. The occupant support of claim 3, wherein the charger includes a processor and a memory storage device, and the charger is configured to cut power transmission to the first and second headrest rods when power transmission between the first headrest rod and the second headrest rod exceeds a predetermined threshold.

5. The occupant support of claim 4, wherein the power transmission system further includes a battery arranged within a space formed in the headrest cushion and coupled to the charger to store power transferred to the battery from the charger, the battery coupled to the device and configured to supply power to the device when power transmission is cut from the charger to the device.

6. An occupant support comprising
a vehicle seat including a seat bottom and a seat back coupled to the seat bottom to extend upwardly away from the seat bottom, the seat back including a backrest and a headrest coupled to the backrest, the headrest including a headrest cushion movable relative to the backrest between an extended arrangement and a retracted arrangement, a pair of headrest rods coupled to the headrest cushion and movable with the headrest cushion relative to the backrest, and a pair of headrest-rod supports coupled to the backrest and formed to include respective rod-receiving spaces configured to receive the headrest rods to mount the headrest cushion to the backrest, and
an electronics system coupled to the seat back and including a vehicle power supple, a device mounted to the headrest cushion and configured to receive power from the vehicle power supply, and a power transmission system configured to regulate power transfer from the vehicle power supply to the device in the headrest cushion, the power transmission system including a charger arranged within a space formed in the backrest and a battery arranged within a space formed in the headrest cushion and coupled to the device, wherein the headrest rods are coupled to the charger and the battery and are configured to conduct power from the charger to the battery to supply power to the device in the headrest cushion, wherein the power transmission system includes an insulative sleeve that at least partially encapsulates each headrest rod, wherein the insulative sleeve is formed to include an opening that extends longitudinally along at least a portion of a length of the headrest rods to expose a section of each headrest rod, wherein the power transmission system further includes a plurality of power-transmission wires and a respective power-transmission wire included in the plurality of power-transmission wires extends through each headrest-rod support and into engagement with each headrest rod, and wherein the power transmission system further includes a conductive element coupled to each respective power-transmission wire, each conductive element mounted to each respective headrest-rod support in a fixed location relative to the headrest-rod supports and in engagement with each headrest rod, the conductive element positioned within the opening formed in the insulative sleeve so that power is transferred from the vehicle power supply to each headrest rod when the headrest is in the extended arrangement and the retracted arrangement.

7. The occupant support of claim 6, wherein a first headrest rod of the pair of headrest rods is a positive terminal and a second headrest rod of the pair of headrest rods is a negative terminal.

8. The occupant support of claim 7, wherein the charger includes a processor and a memory storage device, and the charger cuts power transmission to the first and second headrest rods when power transmission between the first headrest rod and the second headrest rod exceeds a predetermined threshold.

9. The occupant support of claim 8, wherein the battery supplies power to the device when power transmission is cut from the charger to the device.

10. An occupant support comprising
a vehicle seat including a seat bottom and a seat back coupled to the seat bottom to extend upwardly away from the seat bottom, the seat back including a backrest and a headrest coupled to the backrest, the headrest including a headrest cushion movable relative to the backrest, a headrest rod coupled to the headrest cushion and movable with the headrest cushion relative to the backrest, and a headrest-rod support coupled to the backrest and formed to include rod-receiving space configured to receive the headrest rod to mount the headrest cushion to the backrest and
a device coupled to the headrest cushion,
wherein the headrest rod is coupled electrically with a power supply and is configured to provide a power transmission system that conducts power through the headrest rod from the backrest to the headrest cushion to supply power to the device in the headrest cushion,
wherein the headrest rod is at least partially encapsulated by an insulative sleeve, and the insulative sleeve is formed to include an opening that extends longitudinally along at least a portion of a length of the headrest rods to expose a section of each headrest rod, and
wherein the power transmission system further includes a conductive element coupled to the headrest rod, the conductive element mounted to the headrest-rod support in a fixed location relative to the headrest-rod support, the conductive element positioned within the opening formed in the insulative sleeve so that power is transferred from the vehicle power supply to the headrest rod when the headrest is in the extended arrangement and the retracted arrangement.

11. The occupant support of claim 10, wherein the headrest includes a pair of headrest rods and wherein the headrest rod is a first headrest rod of the pair of headrest rods and is a positive terminal and a second headrest rod of the pair of headrest rods is a negative terminal.

12. The occupant support of claim 11, wherein the power transmission system includes a charger arranged within a space formed in the backrest and coupled to the first headrest rod and the second headrest rod to form a circuit.

13. The occupant support of claim 12, wherein the charger includes a processor and a memory storage device, and the charger cuts power transmission to the first and second headrest rods when power transmission between the first headrest rod and the second headrest rod exceeds a predetermined threshold.

14. The occupant support of claim 13, wherein the battery supplies power to the device when power transmission is cut from the charger to the device.

15. The occupant support of claim 10, wherein the power transmission system further includes a power-transmission wire that extends through the insulative sleeve and is coupled to the headrest rod via the conducted element.

* * * * *